United States Patent Office 2,760,907
Patented Aug. 28, 1956

2,760,907

HYDROCARBON CONVERSION PROCESS AND CATALYST

Edward C. Attane, Jr., Fullerton, Grant W. Hendricks, Brea, and Hal C. Huffman, Long Beach, Calif., assignors to Union Oil Company of California, Los Angeles, Calif., a corporation of California No Drawing. Application September 1, 1953, Serial No. 377,965

20 Claims. (Cl. 196—28)

This invention relates generally to catalysts and to catalytic processes for the conversion of hydrocarbons and hydrocarbon mixtures. More particularly this invention relates to a new and improved method for the preparation of certain halogenated molybdenum-containing catalysts which are supported on carriers and to methods for using such catalysts.

Supported molybdenum-containing catalysts such as molybdenum oxide-alumina catalysts are well known in the art for effecting various hydrogen exchange reactions with hydrocarbons such as desulfurization, denitrogenation, hydrogenation, dehydrogenation, hydroforming, hydrocracking, and the like. In addition to molybdenum oxides other oxides may be employed in conjunction therewith such as cobalt, iron, nickel, and the like.

Hydrofluoric acid as well as numerous other acids have been employed in the prior art in the preparation of catalysts and carriers for catalysts. In some cases the material is treated to replace a metal ion, such as calcium or sodium, with a hydronium ion as in the activation of naturally occurring montmorillonite clays for cracking catalysts. In other cases various sands or clays may be treated to dissolve a part or all of one of the components thereof. Thus sands may be treated with hydrofluoric acid in order to dissolve a substantial part, e. g., 5 to 80% by weight, of the sand and thereby increase the catalytic surface per unit weight of material. In all such cases there is a general decrease in the weight of the treated material as compared to the untreated. The treated material is normally exhaustively washed to remove the contaminating anions introduced by the acid treatment prior to its use for catalytic purposes. In some cases the acid treated carrier is neutralized with ammonia and heated to vaporize the ammonium salts formed thereby.

Thus where hydrofluoric acid treatment has been employed in the literature, the fluorine has been removed by washing, vaporization as ammonium fluoride, etc.

It has now been found that when a halogen such as fluorine or chlorine is incorporated into a molybdenum oxide supported type catalyst by impregnation of the carrier, either before or after the deposition of the molybdenum oxide, and in such a manner that the halogen is mostly or wholly retained by the carrier, such halogen acts as a promoter and increases the activity of the catalyst for effecting various hydrocarbon conversion reactions.

It is an object of this invention to promote the activity of molybdenum-containing catalysts which are supported on suitable carriers and thereby improve the hydrocarbon conversion reactions employing such catalysts.

It is another object of this invention to provide a method for promoting molybdenum-containing catalysts with fluorine- or chlorine-containing inorganic acids.

It is another object of this invention to provide a process for reforming gasolines with supported molybdenum oxide catalysts of improved activity.

It is another object of this invention to provide hydrocarbon conversion processes which employ fluorine- or chlorine-promoted molybdenum-containing catalysts.

It is another object of this invention to provide a new catalyst for hydrocarbon conversion processes such as reforming, denitrogenation, desulfurization and the like.

Other objects and advantages of this invention will become apparent to those skilled in the art as the description thereof proceeds.

Briefly this invention relates to the preparation and use of supported molybdenum oxide catalysts which may or may not contain oxides of one or more metals of the group iron, nickel and cobalt wherein such catalysts are promoted with inorganic fluorine or chlorine compounds. In the preparation of these catalysts the halogen compound is impregnated upon the carrier either before or after inclusion or impregnation of the molybdenum and other metal oxides. The impregnation of the halogen is accomplished by impregnation of the carrier with an aqueous solution of an inorganic fluorinated or chlorinated acid such as hydrofluoric acid, or hydrochloric acid. In the preparation of such catalysts a suitable adsorbent carrier such as alumina, alumina-silica and titania or the like is selected.

The molybdenum and other metal oxide to be employed therewith may be deposited on the carrier by impregnation, coprecipitation, co-pilling or any other suitable method of catalyst preparation. The impregnation method is preferred since more active catalysts are obtained by this method.

In preparing the preferred catalyst of this invention wherein the molybdenum oxide, the other metal oxide and the halogen-containing acid are each impregnated on the carrier, a number of different sequences of impregnation may be employed.

In the preferred method of catalyst preparation the halogen-containing acid, which is preferably a fluorine-containing acid, is first deposited upon the carrier. After a suitable drying and activation of the acid-impregnated carrier, the molybdenum or the other metal oxide, e. g., cobalt, or both, is or are deposited by impregnation. Of these the preferred method is to impregnate first with the molybdenum and after a suitable drying and activation again impregnate with cobalt oxide for example. Alternatively the impregnation with the cobalt may precede the impregnation with molybdenum. In yet another modification the cobalt and molybdenum may be co-impregnated by employing a suitable ammoniacal cobalt molybdate solution prepared according to the method described in U. S. Patent 2,486,361.

While the preferred method for preparing the catalyst of this invention is to impregnate the carrier first with the hydrofluoric acid, nevertheless the acid impregnation may in certain instances follow the impregnation of either the cobalt or the molybdenum or both. Where such a modification is employed it is normally preferable that the acid impregnation follow the impregnations of the cobalt and molybdenum or the co-impregnation of cobalt and molybdenum which ever the case may be. In this preferred method, catalysts of the type prepared in U. S. Patent 2,486,361 are subjected to impregnation with a halogen-containing acid according to the methods of this invention.

The resulting catalysts may be employed for various hydrocarbon conversions described hereinafter such as desulfurization, denitrogenation, hydrogenation, reforming such as hydroforming, isomerization and the like.

The carriers which are suitable and may be employed for distending the mixtures of molybdic oxides and halogens according to the process of this invention comprise alumina, silica, zirconia, thoria, magnesia, magnesium hydroxide, titania or any combination of these. The preferred carrier is activated, gel-type alumina. Alumina gel containing between about 1% and 15% and preferably between about 3% and 8% of coprecipitated silica are especially suitable carriers. The presence of the small amount of silica in the alumina serves to stabilize the resulting catalyst and prolongs the catalyst life as is described in U. S. Patent 2,437,532.

Prior to the impregnation steps, the carrier is normally shaped into the physical form desired for the catalyst. For this purpose the dried carrier is usually ground, mixed with a lubricant such as graphite or hydrogenated vegetable oil, and pilled. In the activation of the carrier the lubricant is removed by combustion. Alternatively the carrier may be used in granular form; or it may be ground into powder, made into a paste and extruded. Where the catalyst is to be employed in a fluidized process, such as in fluidized desulfurization, denitrogenation, and the like, the carrier is formed into a finely divided state as in micro-bead form, or it is ground into a fine state and is thereafter impregnated. In the case of fluidized processes the carrier can be impregnated in larger form, e. g. granules, pills, etc., and thereafter ground to the desired powder size for the processing.

In the preparation of the carrier for either the initial or a subsequent impregnation, the carrier is activated by heating in order to render it sufficiently adsorbent for the impregnation. This activation may be, for example, effected by heating for 2 to 6 hours at 800° F. to 1200° F. The carrier is then cooled and immersed in the impregnation solution. The impregnation solution is absorbed by the carrier and the excess solution is thereafter removed. The impregnated carrier is drained and dried in a low temperature oven to remove the bulk of the water. Following the drying at, for example, 180° F. to 230° F., the mixture is activated by heating it to a temperature of, for example, 800° F. to 1200° F. for two to six hours. Where the impregnation has been with either molybdenum and a metal salt of the iron, nickel or cobalt group, the metal salts are decomposed during the activation to form the desired molybdenum or metal oxides.

The preferred method for preparing halogen-impregnated catalysts of this invention is carried out by first depositing the halogen on the carrier by an impregnation step and thereafter depositing the molybdenum and the other metal oxides thereon.

In the preparation of a carrier for impregnation with a halogen-containing acid, the carrier is first heated in an activation step to render it sufficiently adsorbent for impregnation. This activation may be effected by heating from two to six hours at 800° F. to 1200° F. for example. After the carrier has been cooled, it is immersed in the acid impregnation solution.

A part of the impregnation solution is adsorbed by the carrier, and the non-adsorbed excess solution is removed after a suitable impregnation period, such as between about ten minutes and one hour. The impregnated carrier after draining is dried in a low temperature oven, which may be maintained between 180° F. and 230° F., for example, in order to remove the bulk of the water. The acid-impregnated carrier is thereafter activated by heating to a temperature between about 800° F. and 1200° F. for two to six hours, for example, in order to condition the carrier for the subsequent molybdic oxide impregnation.

In certain cases a series of halogen-containing acid impregnations may be made in order to obtain a suitably high content of halogen on the finished catalyst.

The acid impregnation solution according to the method of this invention may be prepared from fluorine-containing inorganic acids such as hydrofluoric acid, fluorosulfonic acid and fluorosilicic acid and the like. Chlorine-containing acids, such as hydrochloric acid, chlorosulfonic acid and the like, may be employed.

In general the fluorine or chlorine retained by the carrier varies directly with the concentration of the impregnating solution. With the use of alumina or alumina-silica carriers it has been found that the preparation of catalysts containing between 0.2% and 5% by weight of fluorine or chlorine require impregnating solutions containing between about 0.4 and 10.4 grams of fluorine (as F) or chlorine (as Cl) per 100 ml. of solution.

While other concentrations of fluorine or chlorine may sometimes be employed, we generally employ between about 0.05% and 5% of fluorine or chlorine and we prefer to employ between about 0.2% and 3% of fluorine or chlorine based upon the finished catalyst.

In the impregnation with molybdenum the activated carrier is immersed in the molybdenum impregnation solution for about ten minutes to one hour, for example. A part of the impregnation solution is adsorbed by the carrier and the excess solution is thereafter removed. The impregnated carrier after draining and drying in a low temperature oven such as at 180° F. to 230° F., for example, is finally activated by heating to a temperature of 800° F. to 1200° F. for two to six hours, for example, whereupon the molybdenum salts are decomposed to form the desired molybdenum oxides.

The molybdenum-containing impregnation solution is preferably ammoniacal ammonium molybdate although aqueous solutions of other soluble molybdenum compounds may be employed. In the preferred method, ammonium paramolybdate (which usually assays about 81% $MoO_3$) is dissolved in about 14% aqueous ammonia and the resulting mixture is diluted with distilled water or with more dilute aqueous ammonia to form a clear ammonium molybdate solution of the desired concentration. The concentration of the ammonium molybdate solution will depend on the particular carrier being employed and on the desired concentration of molybdenum in the finished catalyst. Where alumina or alumina-silica carriers are employed, and a finished catalyst comprising between about 7% to 12% of $MoO_3$ is desired, the molybdenum-containing impregnation solutions will have a concentration of molybdenum ranging from about 14 to 24 grams of $MoO_3/100$ ml.

While the method of this invention may be employed to prepare catalysts which contain different percentages of molybdenum oxide, those containing from about 5% to 25% by weight and preferably from about 7% to 12% by weight of molybdenum oxide, calculated as $MoO_3$ are most generally employed.

Oxides which have been found to be especially advantageous for use in conjunction with the molybdenum oxides include the oxides of iron, nickel and cobalt. Such oxides may be deposited by impregnation of the carrier either prior to, concurrent with, or subsequent to the impregnation of the molybdenum. The nitrates of these elements are water-soluble and aqueous solutions of these nitrates may be employed as impregnation solutions. The preferred metal for use in conjunction with molybdenum oxides is cobalt.

The cobalt-containing impregnation solution is preferably an aqueous solution of cobaltous nitrate although other water-soluble compounds of cobalt may be employed. Thus cobalt chloride and cobalt sulfate may be employed in the impregnation solutions although these compounds are more difficultly decomposable to active forms and require both heat and oxidation to complete their conversion to the oxide. The concentration of the cobalt-containing impregnation solution will depend upon the carrier being employed and the desired concentration of cobalt in the finished catalyst. Where alumina or alumina-silica carriers are employed and where a final catalyst composition containing from about 2% to 10% by weight of CoO is desired, the concentration of the cobalt impregnation solution will range from about 4 to 23 grams of CoO/100 ml.

Nickel impregnation solutions and iron impregnations are prepared similarly and these employ about the same concentration ranges. Where about 2% to 10% of NiO or FeO is desired on the catalyst, the impregnation solution will normally contain between about 4 and 23 grams of NiO or FeO per 100 ml.

While the preferred method for depositing molybdenum oxide and other metallic oxides on the support is by impregnation as described hereinbefore, these oxides may be deposited by other methods such as by coprecipitation, co-pilling and the like. In one method of coprecipitation, for example, ammoniacal ammonium molybdate solution may be added to an aqueous solution of aluminum nitrate and cobalt nitrate for example, thereby causing the coprecipitation of a hydrogel of aluminum, cobalt and molybdenum oxides. After washing and drying the co-gel it is heated to 800 to 1200° F., for example, whereupon it becomes adsorbent and may be employed for impregnation with hydrofluoric acid.

The finished catalyst is useful for effecting various hydrocarbon conversion reactions such as isomerization, desulfurization, denitrogenation, hydrogenation, hydroforming, reforming, hydrocracking, destructive hydrogenation and the like. Such reactions may be carried out in the presence of hydrogen at temperatures between about 500° F. and 1500° F. and especially at temperatures between about 600° F. and 1200° F.

During usage varying amounts of deposits, comprising mostly carbon, nitrogen and sulfur compounds, accumulate on the catalyst and are periodically removed by regeneration. Regeneration is effected by passing air diluted with flue gas, steam, nitrogen or other inert gas over the catalyst to combust the deposits while maintaining the temperature of the catalyst between 800° F. and 1200° F. The combustion is completed in the presence of undiluted air while maintaining the temperature of the catalyst between 800° F. and 1200° F. The regenerated catalyst after reduction with hydrogen may be reemployed for hydrocarbon conversion catalysis.

For the purpose of desulfurizing petroleum stocks, shale distillates and the like, the catalyst of this invention is preferably employed under the following conditions: reaction temperatures between about 600° F. to 1000° F., pressures between about atmospheric and 5000 lbs. per sq. in. or more and at liquid hourly space velocities between about 0.2 and 50.0 volumes of liquid feed stock per volume of catalyst per hour, and 50 to 10,000 cu. ft. of added hydrogen per barrel of feed. The particular set of conditions within these ranges is determined by the stock to be desulfurized and by the nature of the product desired.

The catalyst in this invention can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are preferably employed: reaction temperatures between about 700° F. and 1000° F., pressures between about 50 and 10,000 lbs. per sq. in., feed rates between about 0.2 and 10.0 volumes of liquid feed stock per volume of catalyst per hour, and about 500 to 10,000 cu. ft. of added hydrogen per barrel of feed. For the removal of nitrogen it is often desirable to employ a two-stage denitrogenation process wherein the ammonia synthesized in the first stage is removed from the first stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalyst of this invention may also be employed for the reforming processes such as for that reforming process which is generally termed "hydroforming." This process serves to reform a gasoline range hydrocarbon stock and increase its aromatic content and improve its octane rating. For processing stocks for the purpose of reforming and increasing their aromaticity, the following conditions are preferably employed: reaction temperatures between about 700° F. and 1200° F., pressures between about 50 to 1,000 lbs. per sq. in., liquid hourly space velocities between about 0.2 and 4.0 volumes of liquid feed stock per volume of catalyst per hour, and about 1,000 to 10,000 cu. ft. of added hydrogen per barrel of feed. The specific conditions are determined by the nature of the specific feed stock employed and the quality of the product desired.

When iron, nickel or cobalt oxide is employed in conjunction with molybdenum oxides and hydrogen fluoride, the catalyst generally comprises between about 2% to 15% of molybdenum oxide as $MoO_3$ and between about 12% and 0.5% of iron, nickel or cobalt oxides, calculated as FeO, NiO or CoO. Usually between about 7% and 22% and preferably between about 9% and 16% of molybdenum oxides plus the iron group metal oxides are employed. Catalysts containing other than the foregoing preferred compositions may also be employed if desired however.

Perhaps the process of this invention is best illustrated by the following specific examples.

EXAMPLE I

An alumina-silica gel containing an estimated 95% $Al_2O_3$ and 5% $SiO_2$ by weight was prepared by the coprecipitation of an aqueous mixture of sodium aluminate and sodium silicate with carbon dioxide. The precipitate was washed until substantially free of sodium ions, dried at 200–220° F. and activated by heating for two hours at about 1100° F.

About 420 parts by weight of the activated carrier were immersed in an ammoniacal ammonium molybdate solution prepared by dissolving about 97 parts by weight of ammonium paramolybdate (assaying about 81% $MoO_3$) in a mixture of about 225 parts by weight of 28% aqueous ammonium hydroxide and about 233 parts by weight of distilled water. The impregnated carrier was drained of the excess solution, dried and calcined for two hours at about 1100° F. The carrier supporting the molybdic oxide was thereafter immersed in an aqueous solution of cobaltous nitrate prepared by dissolving about 109 parts by weight of cobaltous nitrate hexahydrate in about 390 parts by weight of distilled water. The impregnated carrier was drained of the excess solution, dried and activated by heating for two hours at 600° C. This material was designated catalyst No. 1.

Catalyst 2 was prepared by impregnation of a portion of catalyst 1 with hydrofluoric acid solution as follows:

A hydrofluoric acid impregnation solution was prepared by dissolving about 2.7 parts by weight of 52% hydrofluoric acid in 299 parts by weight of water. About 330 parts by weight of catalyst 1 were immersed in the impregnation solution, drained, dried, and activated by heating at about 1100° F. for six hours.

For evaluating the activities of these catalysts a straight-run petroleum fraction boiling in the range of approximately 200 to 400° F. from a California crude was selected for reforming. The feed stock had a gravity of 54.4° A. P. I. and an octane rating of 62 as measured by the Research Method.

At the beginning of a run the catalyst was reduced at atmospheric pressure with hydrogen while controlling the rate to maintain the temperature below 1050° F. after which time reduction was completed under pressure, such as at the reaction pressure to be employed. While continuing the hydrogen flow through the catalyst the preheated feed stock was started through the catalyst bed and continued at the desired feed rate measured in terms of volumes of liquid feed stock per volume of catalyst per hour (also referred to as v./v.) and for the desired number of hours, after which time the hydrogen addition was continued for a short while in order to purge the catalyst of products.

The liquid product was cooled under pressure, withdrawn and washed with both caustic and water.

The data obtained from the liquid products for the catalysts as well as the composition of the catalysts themselves are shown in Table I.

Table I

| Catalyst Number | 1 | 2 |
|---|---|---|
| Composition: | | |
| F, Wt. Percent | 0 | 0.2 |
| CoO, Wt. Percent | 3.0 | 2.9 |
| MoO₃, Wt. percent | 8.6 | 8.6 |
| Test conditions: | | |
| Temperature, °F | 900 | 900 |
| Pressure, p. s. i | 300 | 300 |
| Liquid hourly space velocity | 3.0 | 3.0 |
| Hydrogen addition, cu. ft./bbl | 5,000 | 5,000 |
| Run length, hours | 4 | 4 |
| Liquid Product Examination: | | |
| Volume percent of feed | 91 | 87 |
| Octane Rating, Research Method | 82.5 | 91 |
| Volume Percent of Aromatics | 37 | 48 |

Examination of Table I shows that the inclusion of only 0.2% by weight of fluorine in the cobalt molybdate type catalyst increased the octane rating 8.5 numbers while at the same time the aromatic content of the product was increased from 37 to 48 volume percent and the liquid product recovery was decreased only slightly. The addition of about 3 ml. of tetraethyl lead fluid to the product obtained with the fluorine promoted catalyst gave a research octane rating of 99.

EXAMPLE II

In the preparation of catalyst 3 a hydrofluoric acid impregnation solution was prepared by dissolving 7.0 parts by weight of 52% aqueous hydrofluoric acid in 993 parts by weight of water, about 1000 parts by weight of activated alumina gel containing about 5% of coprecipitated silica gel was immersed in the hydrofluoric acid solution at about 40° F. for 30 minutes. The impregnated carrier was drained, dried overnight at 225° F. and finally activated by heating for two hours at about 1100° F.

A molybdenum impregnation solution was prepared by dissolving about 221 parts by weight of ammonium molybdate assaying about 81% of MoO₃ in a mixture of about 225 parts by weight of 28% ammonium hydroxide in 500 parts by weight of water. The hydrofluoric acid impregnated carrier was immersed in the molybdenum impregnation solution for one hour. The molybdenum-impregnated carrier was drained, dried and again activated by heating at about 1100° F. for two hours.

A cobalt impregnation solution was prepared by dissolving about 234 parts by weight of cobalt nitrate hexahydrate in about 500 parts by weight of water. The impregnated carrier from the molybdenum impregnation step was immersed in the cobalt impregnating solution for one hour after which it was drained, dried and again activated by heating at about 1100° F. for two hours. The impregnated catalyst from the cobalt impregnation step was designated catalyst No. 3.

In the preparation of catalyst No. 4 an impregnation solution of the same concentration as was employed for preparing catalyst No. 3 was prepared from hydrofluoric acid and water. About 1000 parts by weight of the same alumina-silica gel were impregnated with 1000 parts by weight of the hydrofluoric acid impregnation solution and the carrier after removal from the excess solution was drained, dried and activated by heating at about 1100° F. for two hours. A second batch of hydrofluoric acid impregnation solution of the same strength was prepared and the acid-impregnated carrier from the first step was reimpregnated with the second batch of hydrofluoric acid impregnation solution. The carrier was drained, dried and activated as before. The twice hydrofluoric acid-impregnated carrier was thereupon impregnated first with molybdenum and second with cobalt employing solutions of the same strength and quantity as was employed in preparing catalyst No. 3. Catalyst No. 5 was prepared in the same manner as catalyst No. 4 with the exception that the carrier was three times impregnated with the hydrofluoric acid impregnating solutions after which the treatment was identical thereon.

Catalyst 1 of Example I and catalysts 3, 4 and 5 were employed for reforming and desulfurizing simultaneously a Santa Maria Valley pressure distillate of the gasoline boiling range having the following characteristics:

| | |
|---|---|
| Gravity °API at 60° F | 45.6 |
| Sulfur, weight percent | 1.81 |
| Aromatic content, volume percent | ca. 11 |
| Octane rating, research method | 63.5 |

The four catalysts were tested in a manner similar to that described in Example I and the test conditions together with the catalyst composition and products obtained therefrom are shown in Table II.

Table II

| Catalyst Number | 1 | 3 | 4 | 5 |
|---|---|---|---|---|
| Composition: | | | | |
| F, Wt. Percent | 0 | 0.2 | 0.4 | 0.6 |
| CoO, Wt. Percent | 3.0 | 2.6 | 2.7 | 2.6 |
| MoO₃, Wt. Percent | 8.6 | 8.1 | 7.6 | 7.5 |
| Test Conditions: | | | | |
| Temperature, °F | 875 | 875 | 875 | 875 |
| Pressure, p. s. i | 200 | 200 | 200 | 200 |
| Liquid hourly space velocity | 1.0 | 1.0 | 1.0 | 1.0 |
| Hydrogen addition, cu. ft./bbl | 3,000 | 3,000 | 3,000 | 3,000 |
| Run length, hours | 4 | 4 | 4 | 4 |
| Liquid Product Examination: | | | | |
| Volume Percent of feed | 92 | 87 | 87 | 87 |
| Octane Rating, Research Method | 76 | 81 | 82 | 81 |

Examination of the data of Table II shows that the inclusion of about 0.2–0.6 by weight of fluorine increased the knock rating of the product from 76 to about 81–82. The sulfur content of the product of each of the four runs was less than about 0.03% by weight as S.

EXAMPLE III

Catalysts 1 and 2 prepared in Example I are also employed for simultaneously desulfurizing and denitrogenating an educted shale oil distillate having the following characteristics:

| | |
|---|---|
| Gravity, °A. P. I. at 60° F | 27.2 |
| Nitrogen, wt. percent | 1.72 |
| Sulfur, wt. percent | 0.74 |

The data in Table III are obtained when the tests are made with a hydrogen pressure of 1100 pounds per square inch guage, a catalyst bed temperature of about 770° F., the addition of from 3.7 to 4.0 thousand cubic feet of hydrogen per barrel of feed.

Table III

| Catalyst Number | 1 | 2 |
|---|---|---|
| Conditions of Run: | | |
| Catalyst Temperature, °F | 770 | 770 |
| Pressure, lb./sq. in. gauge | 1,100 | 1,100 |
| Added Hydrogen, MCF/bbl. Feed | 4.0 | 4.0 |
| Run Length, Hours | 24 | 24 |
| Volumes feed/volume catalyst/hr | 0.5 | 0.5 |
| Product Analysis: | | |
| Nitrogen, Weight Percent | 0.42 | 0.26 |
| Sulfur, Weight Percent | 0.09 | 0.05 |

The denitrogenation as well as the desulfurization are improved by the inclusion of 0.2% by weight of fluorine in the catalyst. Favorable results are also obtained when chlorine is substituted for the fluorine.

EXAMPLE IV

An alumina-silica gel containing an estimated 95% Al₂O₃ and 5% SiO₂ was prepared by the coprecipitation of an aqueous mixture of sodium aluminate and sodium silicate with carbon dioxide. The precipitate was washed until substantially free of sodium ions, dried at 200–220° F. and activated by heating for two hours at about 1100°

F. A solution of ammonium molybdate was prepared by dissolving about 1700 parts by weight of ammonium paramolybdate, assaying about 81% by weight of MoO₃, in about 1790 parts by weight of 28% aqueous ammonia and about 2260 parts by weight of distilled water. About 6350 parts by weight of the activated gel were immersed in the ammoniacal solution of ammonium molybdate, drained, dried and heated at about 1100° F. for about two hours. This material was designated catalyst No. 6.

Catalysts 7 and 8 were prepared by impregnating aliquots of the alumina-silica gel employed for catalyst 6 with a series of two hydrofluoric acid impregnation solutions. The acid solution for catalyst 7 was prepared by dissolving 9.5 parts by weight of 52% aqueous hydrofluoric acid in 252 parts by weight of water; the acid solution for catalyst 8 was prepared from 19.3 parts by weight of 52% hydrofluoric acid and 243 parts by weight of water.

In the preparation of catalyst 7 about 250 parts by weight of the activated alumina-silica gel were immersed in the acid impregnating solution and allowed to absorb solution for about 15 minutes. The gel was then drained free of excess solution, dried at 180–230° F. overnight and finally heated to about 1100° F. for six hours. The carrier for catalyst 8 was prepared similarly.

Following the impregnation of the two carriers with hydrofluoric acid, an aliquot of about 200 parts by weight was taken from each acid impregnated carrier and immersed in about 250 parts by weight of an ammoniacal ammonium molybdate solution prepared according to the method used for the preparation of catalyst 6. After about 20 minutes of immersion, the carrier was drained of excess solution, dried overnight at 180–230° F. and activated at about 1100° F. for six hours.

For evaluating the activities of these catalysts a straight-run petroleum fraction boiling in the range of approximately 200 to 400° F. from a California crude was selected for reforming. The feed stock had a gravity of 54.4° A. P. I. and an octane rating of 62 as measured by the Research Method.

At the beginning of a run the catalyst was first reduced at atmospheric pressure with hydrogen while controlling the rate to maintain the temperature below 1050° F. after which the reduction was finally completed under the reaction pressure to be employed. While continuing the hydrogen flow through the catalyst, the preheated feed stock was started through the catalyst bed and continued at the desired feed rate measured in terms of volumes of liquid feed stock per volume of catalyst per hour (also referred to as v./v.) and for the desired number of hours, after which time the hydrogen addition was continued for a short while in order to purge the catalyst of products.

The liquid product was cooled under pressure, withdrawn and washed with both caustic and water.

The data obtained for the liquid products from the catalysts as well as the composition of the catalysts themselves are shown in Table I.

*Table IV*

| Catalyst Number | 6 | 7 | 8 |
|---|---|---|---|
| Composition: | | | |
| F, Wt. Percent | 0 | 0.4 | 1.0 |
| MoO₃, Wt. Percent | 9.0 | 9.0 | 9.0 |
| Test Conditions: | | | |
| Temperature, ° F | 900 | 900 | 900 |
| Pressure, p. s. i. | 600 | 600 | 600 |
| Liquid hourly space velocity | 3.0 | 3.0 | 3.0 |
| Hydrogen addition, Cu. Ft./Bbl | 5,000 | 5,000 | 5,000 |
| Run length, hours | 4 | 4 | 4 |
| Liquid Product Examination: | | | |
| Volume percent of feed | 95 | 89 | 87 |
| Octane Rating, Research Method | 81.5 | 87.5 | 93.5 |

Examination of Table IV shows that the inclusion of only 0.4% by weight of fluorine increased the research octane rating a full six units. By inclusion of 1.0% fluorine the octane rating was increased 11½ units.

Favorable results are also obtained when hydrochloric acid is substituted for the hydrofluoric acid in the foregoing experiments.

EXAMPLE V

An alumina-silica gel of the type described in Example IV was prepared and impregnated with ammoniacal ammonium molybdate solution as follows: About 200 parts by weight of ammonium paramolybdate, assaying about 81% by weight of MoO₃, in about 183 parts by weight of 28% aqueous ammonia and about 146 parts by weight of distilled water. Approximately 400 parts by weight of the gel were immersed therein for about 30 minutes, drained, dried and calcined for about six hours at about 1100° F.

The adsorbent supported molybdena catalyst was then immersed for about 30 minutes in a solution prepared by mixing 21.7 parts by weight of 48% hydrofluoric acid and 152 parts by weight of distilled water. After draining, drying at 180–230° F. and calcining at about 1100° F. for six hours, the catalyst obtained thereby contained 2.0% by weight of fluorine and 9.3% by weight of MoO₃.

The finished catalyst was tested with the same feed and under the same test conditions as described in Example IV with the exception that a temperature of about 925° F. was employed. About 86.9 volume per cent of liquid product was obtained which had an octane rating (research method) of 87 and this increased to 98 upon the addition of 3.0 ml. of tetraethyl lead fluid. These results are better than those which are obtained when halogen-free catalyst 6 is employed under the same conditions.

When 37% hydrochloric acid is substituted for the 48% hydrofluoric acid in the foregoing example, favorable improvement in the octane rating is again obtained when compared with the halogen-free catalyst 6 of Example IV.

EXAMPLE VI

Catalysts 6 and 8 prepared in Example IV are also employed for simultaneously desulfurizing and denitrogenating an educted shale oil distillate having the following characteristics:

| | |
|---|---|
| Gravity, ° A. P. I. at 60° F | 27.2 |
| Nitrogen, weight percent | 1.72 |
| Sulfur, weight percent | 0.74 |

The reactions are carried out under the following conditions:

| | |
|---|---|
| Catalyst temperature, ° F | 770 |
| Pressure, lb. sq. in. gage | 1100 |
| Added hydrogen, MCF/bbl. feed | 4.0 |
| Run length, hours | 24 |
| Vol. feed/vol. catalyst/hour | 0.5 |

The liquid product obtained with the hydrofluoric acid treated catalyst 8 contains less sulfur and less nitrogen than the liquid product obtained with catalyst 6.

"Impregnation" with hydrofluoric acid or other halogen acids as practiced in this invention is markedly different from the "acid treatment" of various clays and other catalytic materials with hydrofluoric acid as practiced in the prior art. Impregnation is used to denote throughout this disclosure and in the claims the wetting of an adsorbent material with a solution whereby the material adsorbs a part of the solution and retains it. The wetting of the adsorbent with solution may be carried out very rapidly using times as short as a few minutes but more often employing 30 minutes, for example. After adsorption of the solution, the wetted material is dried whereupon it retains elements of the impregnation solution, e. g., combined fluorine. Furthermore, the amount of fluorine retained by the adsorbent, in general, varies as a direct function of the hydrofluoric acid concentration of the impregnation solution.

"Acid treatment" with acids on the other hand almost always involves a loss of weight of the material and is usually followed by washing to remove the acid retained by the material. Acid treatment usually includes a long period of digestion with the acid in order for the acid to effect the leaching or other action.

This application is a continuation-in-part of the co-pending applications Serial Nos. 193,314, and 193,315, now abandoned, both filed October 31, 1950.

The foregoing disclosure of this invention is not to be considered as limiting since many variations may be made by those skilled in the art without departing from the scope or spirit of the following claims.

We claim:

1. A process for the catalytic up-grading of mineral oil hydrocarbons which comprises subjecting said hydrocarbons to a temperature between about 500° F. and 1500° F. in the presence of hydrogen and a catalyst, wherein said catalyst consists essentially of (1) a major proportion of a coprecipitated alumina-silica gel carrier containing between about 1% and 15% $SiO_2$, (2) a minor proportion greater than 0.05% by weight of combined fluorine, (3) between about 2% and 15% of molybdenum oxides calculated as $MoO_3$, and (4) between about 0.5% and 12% of an oxide of a metal selected from the group consisting of iron, nickel and cobalt, and wherein said catalyst has been prepared by first impregnating said carrier with aqueous hydrofluoric acid, draining and drying the acid-impregnated carrier without washing, calcining the dried acid-impregnated carrier at a temperature between about 800° and 1200° F., and thereafter impregnating the calcined carrier with a water soluble molybdenum compound and with a water soluble compound of said metal selected from the group consisting of iron, nickel and cobalt, and finally calcining the metal-impregnated catalyst to activate the same, and to decompose said metal impregnants to the corresponding oxides.

2. A process according to claim 1 in which the catalytic conversion is catalytic desulfurization and is carried out at a temperature between about 600° F. and about 1000° F. and a pressure between about atmospheric and about 5000 p. s. i.

3. A process according to claim 1 in which the catalytic conversion is catalytic hydroforming and is carried out at a temperature between about 700° F. and about 1200° F. and a pressure between about 50 and about 1000 p. s. i.

4. A process according to claim 1 in which the catalytic conversion is catalytic denitrogenation and is carried out at a temperature between about 700° F. and about 1000° F. and a pressure between about 50 and about 10,000 p. s. i.

5. A method for preparing a hydrocarbon conversion catalyst which comprises first impregnating a carrier consisting essentially of activated alumina with an aqueous solution of an inorganic halogen-containing acid, said halogen being selected from the class consisting of fluorine and chlorine, draining and drying the acid-impregnated carrier without washing, calcining the dried acid impregnated carrier at a temperature between about 800° and 1200° F., and thereafter impregnating the calcined carrier with a water soluble molybdenum compound and with a water soluble compound of a metal selected from the group consisting of iron, nickel and cobalt, and finally calcining the metal-impregnated catalyst to activate the same, and to decompose said metal impregnants to the corresponding oxides.

6. A method for preparing a hydrocarbon conversion catalyst which comprises first impregnating a carrier consisting essentially of activated alumina with a water soluble molybdenum compound and with a water soluble compound of a metal selected from the group consisting of iron, nickel and cobalt, drying and calcining the metal impregnated carrier to decompose said metal impregnants to the corresponding oxides, thereafter impregnating the calcined metal-impregnated carrier with a solution of an inorganic halogen-containing acid, said halogen being selected from the group consisting of fluorine and chlorine, draining and drying the acid-impregnated carrier without washing, and finally calcining the dried catalyst to activate the same.

7. A hydrocarbon conversion catalyst consisting essentially of a minor proportion greater than 0.05% by weight of a combined halogen selected from the group consisting of fluorine and chlorine, between about 2% and 25% of molybdenum oxide calculated as $MoO_3$, between about 0.5% and 12% of an oxide of a metal selected from the group consisting of iron, nickel and cobalt and a major proportion of a carrier consisting essentially of an activated alumina, said catalyst having been prepared by the process of claim 5.

8. A hydrocarbon conversion catalyst consisting essentially of a minor proportion greater than 0.05% by weight of a combined halogen selected from the group consisting of fluorine and chlorine, between about 2% and 25% of molybdenum oxide calculated as $MoO_3$, between 0.5% and 12% of an oxide of a metal selected from the group consisting of iron, nickel and cobalt and a major proportion of a carrier consisting essentially of an activated alumina, said catalyst having been prepared by the process of claim 6.

9. A method for preparing a hydrocarbon conversion catalyst which comprises first impregnating a carrier consisting essentially of activated alumina with an aqueous solution of an inorganic halogen-containing acid, said halogen being selected from the class consisting of fluorine and chlorine, draining and drying the acid-impregnated carrier without washing, calcining the dried acid impregnated carrier at a temperature between about 800° and 1200° F., thereafter impregnating the calcined carrier with a water soluble molybdenum compound, and finally calcining the metal-impregnated catalyst to activate the same and to decompose said molybdenum compound to its oxide form.

10. A method for preparing a hydrocarbon conversion catalyst which comprises first impregnating a carrier consisting essentially of activated alumina with a water soluble molybdenum compound, drying and calcining the metal impregnated carrier to decompose said molybdenum compound to its oxide form, thereafter impregnating the calcined carrier with a solution of an inorganic halogen-containing acid, said halogen being selected from the group consisting of fluorine and chlorine, draining and drying the acid-impregnated carrier without washing, and finally calcining the dried catalyst at a temperature between about 800° and 1200° F. to activate the same.

11. A hydrocarbon conversion catalyst consisting essentially of a minor proportion greater than 0.05% by weight of a combined halogen selected from the group consisting of fluorine and chlorine, between about 5% and 25% of molybdenum oxide calculated as $MoO_3$, and a major proportion of a carrier consisting essentially of an activated gel-type alumina, said catalyst having been prepared by the process of claim 9.

12. A hydrocarbon conversion catalyst consisting essentially of a minor proportion greater than 0.05% by weight of a combined halogen selected from the group consisting of fluorine and chlorine, between about 5% and 25% of molybdenum oxide calculated as $MoO_3$, and a major proportion of a carrier consisting essentially of an activated gel-type alumina, said catalyst having been prepared by the process of claim 10.

13. A process for the catalytic up-grading of mineral oil hydrocarbons which comprises subjecting said hydrocarbons to a temperature between about 500° F. and 1500° F. in the presence of hydrogen and a catalyst, wherein said catalyst consists essentially of (1) a major proportion of a carrier which is essentially activated gel-type alumina, (2) a minor proportion greater than 0.05% by weight of a combined halogen selected from the class consisting of fluorine and chlorine, (3) between about 5% and 25% of molybdenum oxides calculated as $MoO_3$, and (4) between about 0.5% and 12% of an oxide of a metal selected from the group consisting of iron, nickel and cobalt, said catalyst having been prepared by a plurality of impregnation steps with intervening and final calcining steps, including impregnating said carrier with an aqueous solution of an inorganic acid of said halogen, draining and drying the acid-impregnated carrier without washing, calcining the dried acid-impregnated carrier at a temperature between about 800° and 1200° F. prior to any subsequent impregnation, impregnating said carrier with a water soluble molybdenum compound and with a water soluble compound of a metal selected from the group consisting of iron, nickel and cobalt, and calcining the doubly metal-impregnated carrier to decompose said metal impregnants to the corresponding oxides prior to any subsequent impregnation step.

14. A process as defined in claim 13 wherein said catalyst is prepared by first impregnating with said inorganic halogen acid, and subsequently impregnating with said molybdenum compound and said metal from the group consisting of iron, nickel and cobalt.

15. A process as defined in claim 13 wherein said catalyst is prepared by first impregnating with said molybdenum compound and said metal from the group consisting of iron, nickel and cobalt, and subsequently impregnating with said halogen acid.

16. A process for the catalytic up-grading of mineral oil hydrocarbons which comprises subjecting said hydrocarbons to a temperature between about 500° and 1500° F. in the presence of hydrogen and a catalyst, wherein said catalyst consists essentially of (1) a minor proportion, greater than 0.05% of a combined halogen selected from the group consisting of fluorine and chlorine, (2) between about 5% and 25% of molybdenum oxide calculated as $MoO_3$, and (3) a major proportion of a carrier consisting essentially of an activated gel-type alumina, said catalyst having been prepared by a double impregnation procedure with intervening and final calcining steps, including impregnating said carrier with an aqueous solution of an inorganic acid of said halogen, draining and drying the acid-impregnated carrier without washing, calcining the dried acid-impregnated carrier at a temperature between about 800° and 1200° F. prior to any subsequent impregnation, impregnating said carrier with a water soluble molybdenum compound, and calcining the molybdenum-impregnated carrier to decompose said molybdenum compound to its oxide prior to any subsequent impregnation step.

17. A process according to claim 16 wherein said carrier is a coprecipitated alumina-silica gel containing between about 1% and 15% $SiO_2$.

18. A process for the catalytic hydroforming of gasoline boiling range hydrocarbons which comprises subjecting said hydrocarbons to a temperature between about 700° and 1200° F. in the presence of hydrogen and a catalyst, wherein said catalyst consists essentially of (1) a minor proportion, greater than 0.05% of a combined halogen selected from the group consisting of fluorine and chlorine, (2) between about 5% and 25% of molybdenum oxide calculated as $MoO_3$, and (3) a major proportion of a carrier consisting essentially of an activated gel-type alumina, said catalyst having been prepared by a double impregnation procedure with intervening and final calcining steps, including impregnating said carrier with an aqueous solution of an inorganic acid of said halogen, draining and drying the acid-impregnated carrier without washing, calcining the dried acid-impregnated carrier at a temperature between about 800° and 1200° F. prior to any subsequent impregnation, impregnating said carrier with a water-soluble molybdenum compound, and calcining the molybdenum-impregnated carrier to decompose said molybdenum compound to its oxide prior to any subsequent impregnation step.

19. A process according to claim 18 wherein said catalyst is prepared by first impregnating with said halogen acid, and subsequently impregnating with said molybdenum compound.

20. A process according to claim 18 wherein said catalyst is prepared by first impregnating with said molybdenum compound, and subsequently impregnating with said halogen acid.

References Cited in the file of this patent
UNITED STATES PATENTS

| | | |
|---|---|---|
| 2,322,622 | Fischer et al. | June 22, 1943 |
| 2,348,624 | Hillman | May 9, 1944 |
| 2,454,724 | Tamele et al. | Nov. 23, 1948 |
| 2,500,146 | Fleck | Mar. 14, 1950 |
| 2,574,355 | Smith | Nov. 6, 1951 |
| 2,591,525 | Engel et al. | Apr. 1, 1952 |